US007698348B2

(12) United States Patent
Walker et al.

(10) Patent No.: US 7,698,348 B2
(45) Date of Patent: Apr. 13, 2010

(54) EXTENDED DATABASE ENGINE PROVIDING VERSIONING AND EMBEDDED ANALYTICS

(75) Inventors: Robert Nigel Walker, Richmond (CA); Robert Duncan Klett, Ottawa (CA); James Robert Crozman, Ottawa (CA); Mark Shyo Mototsune, Ottawa (CA)

(73) Assignee: Kinaxis Holdings Inc., Ottawa, Ontario (CA)

( * ) Notice: Subject to any disclaimer, the term of this patent is extended or adjusted under 35 U.S.C. 154(b) by 1111 days.

(21) Appl. No.: 10/830,690

(22) Filed: Apr. 23, 2004

(65) Prior Publication Data

US 2005/0138013 A1 Jun. 23, 2005

Related U.S. Application Data

(60) Provisional application No. 60/530,956, filed on Dec. 19, 2003.

(51) Int. Cl.
*G06F 17/20* (2006.01)
*G06F 15/16* (2006.01)

(52) U.S. Cl. .................. 707/790; 707/802; 707/803

(58) Field of Classification Search ............. 707/102, 707/203
See application file for complete search history.

(56) References Cited

U.S. PATENT DOCUMENTS

| | | | | |
|---|---|---|---|---|
| 6,122,645 | A * | 9/2000 | Bohannon et al. | 707/203 |
| 6,374,263 | B1 * | 4/2002 | Bunger et al. | 707/201 |
| 6,460,055 | B1 * | 10/2002 | Midgley et al. | 707/204 |
| 6,631,386 | B1 * | 10/2003 | Arun et al. | 707/203 |
| 6,763,357 | B1 | 7/2004 | Manikarao et al. | |
| 7,058,587 | B1 * | 6/2006 | Horne | 705/7 |
| 7,107,594 | B1 * | 9/2006 | Fischer et al. | 719/310 |
| 7,110,997 | B1 * | 9/2006 | Turkel et al. | 707/3 |
| 2002/0087798 | A1 * | 7/2002 | Perincherry et al. | 711/133 |
| 2003/0046307 | A1 * | 3/2003 | Rivette et al. | 707/104.1 |
| 2003/0101434 | A1 * | 5/2003 | Szyperski | 717/120 |
| 2003/0216952 | A1 | 11/2003 | Klett et al. | |
| 2004/0010442 | A1 * | 1/2004 | Merker et al. | 705/10 |

OTHER PUBLICATIONS

Albrecht, J. et al, "Management of Multidimensional Aggregates for Efficient Online Analytical Processing", Database Engineering and Applications, 1999. IDEAS '99. International Symposium Processings, Montreal, Quebec, Canada Aug. 2-4, 1999, Los Alamitos, Caifornia, USA, IEEE Comput. Soc. US, Aug. 2, 1999, pp. 156-164.
Bansal, S. Ed—Chick S. E. et al., 'Institute of Electrical and Electronics Engineers: "Theory and Practice of Advanced Planner and Optimizer in Supply Chain Domain", Proceedings of the 2003 Winter Simulation Conference, WSC '03, New Orleans, LA, Dec. 7-10, 2003; Winter Simulation Conference, New York, NY: IEEE, US, vol. 2 of 2, Conf. 36, Dec. 7, 2003, pp. 1424-1432.

(Continued)

*Primary Examiner*—John E Breene
*Assistant Examiner*—Alex Gofman
(74) *Attorney, Agent, or Firm*—Wilmer Cutler Pickering Hale and Dorr LLP

(57) ABSTRACT

A system for calculating analytics uses a relational database to store inputs, calculates results, and stores them in cache. The system also includes an access layer that provides a unified view of the data in server. A dynamic access layer is generated at runtime to run an analytic to provide a flexible framework for creating business logic.

32 Claims, 9 Drawing Sheets

OTHER PUBLICATIONS

Fay, D: 'An Architecture for Distributed Applications on the Internet: Overview of Microsoft's .Net Platform, Parallel and Distributed Processing Symposium, 2003. Proceedings. International Apr. 22-26, 2003, Piscataway, NJ, USA, IEE, Apr. 23, 2003, pp. 90-96.

Will et al., "SAP APO-Systemadministration" 2002, SAP APO System Administration, Principles for Effective APO System Management, p. 23, excerpt: chapter 4, pp. 93-110 (p. 93, paragraph 1—p. 99, paragraph 4).

* cited by examiner

EXTENDED DATABASE ENGINE PROVIDING VERSIONING AND EMBEDDED ANALYTICS

CROSS-REFERENCE TO RELATED APPLICATION

This application claims priority from provisional Ser. No. 60/530,956, filed Dec. 19, 2003, which is expressly incorporated by reference.

FIELD OF THE INVENTION

The present inventions relate to systems and methods for data storage and processing, particularly for business applications.

BACKGROUND OF THE INVENTION

In a typical system that uses analytics and has a traditional database, primary storage of data is on a disk with slower access than direct memory, and analytics are external to a database engine. If there is any data versioning, it is supported through applications external to the database engine and/or by storing multiple complete sets of data corresponding to the versions. Some systems support "multi-value concurrency control," which is similar to multiple versions, but the different "version" only exists while a collection of transactions is being processed. If a user wants to query calculated data, the user runs the calculation and stores the results in the database; the user can then perform standard database queries of those results.

Other decision support tools, such as spreadsheets, typically have a single version of the data (or a complete copy), and all data must be managed by the user.

Source code control systems (SCCS) typically allow recovery of any version of files from a master copy and stored changes. Unlike a system for managing versions of data for processing, an SCCS does not include analytics related to the versioned data. An SCCS passes its retrieved version to a compiler or other text handling program whose output is the program in another form.

In a prior product currently provided by Webplan Inc. (assignee of the present invention), input data is stored in a server in server memory. There is no tight coupling to a back-end database. The data can be accessed rapidly from the server and inverse sets can be made from the data, but data storage is limited by physical memory and the address space of the underlying operating system. Records are stored in server memory with link, version, flag, and data fields. Analytics for making calculations on the input data are compiled as part of a database engine, making it difficult to change analytics for different applications. The server has a cache for storing results calculated from input data.

Some databases implement a model of stored procedures. Stored program elements are invoked directly by users, sometimes triggered by database activity such as inserts, deletes, or modifies. The results of the stored procedures are either stored back into the database or consist of a small set of data put into a temporary place.

SUMMARY OF THE INVENTION

The present invention includes extensions to database technology that can be used independently, and that can provide increased value when used together. The extensions include an efficient method of storing and accessing different versions of stored data; a model that embeds analytics so that calculated results can be accessed as if they were part of the input data, but are actually recalculated as required; a model that allows analytics to be changed and added to while the server or engine is running, protecting the engine from errors in such analytic programs; a method for accessing input data and calculated results through memory storage to provide high speed access and analytic calculation; and an efficient method for comparing data (input or calculated) from any number of the various versions.

The invention extends a database which stores input data used in calculations of analytic results for a multitude of different scenarios (also referred to here as "plans"). Rather than storing complete copies of each set of input data, selected parts of the data and differences can be stored, thereby providing access to numerous scenarios without incurring the storage requirements of complete copies of each dataset (which can be large). Data can be merged from one version into another, thus providing a mechanism for multiple users to collaborate in the decision process. The methods for merging data changes can also be used to commit a complete set of transactions into another version, all at once and efficiently. The system can compare data from any number of versions. Comparisons can use any combination of input data, calculated results, and expressions based on input and calculated data.

The system allows a user to make a query for data without specifying an analytic; the system is responsive to the query to run as much of the appropriate analytic as necessary to respond to the query, store the calculated results into cache, and return the results to the user. The cache is preferably in a separate server, but a cache for such calculated results could be provided as part of a database system. Running the analytic can require a series of nested calculations—the selected analytic could require one or more pieces of data as inputs that are calculated by another analytic, which in turn could require calculations of still another analytic. Whether a user query requires just data retrieval or a more complex calculation can be made transparent to the user, the process of running, storing, and returning results is performed automatically in response to the query.

The extended database also includes analytics used by the database engine that build upon primitives defined within the engine to provide linking between the memory-resident data, the database, and the analytics. Actual analytics can be attached to the engine as required, allowing the same architecture (and in some cases the same engine instance) to be used for a myriad of applications. The system includes dynamic coupling and caching to a disk-based database.

The system has an access layer built on the .NET framework. A database schema can be minimally defined, and a series of analytics can be provided initially. The user of the system can further define the schema, and can create analytics that can be used without having to re-compile the database engine. Rather than compiling an access layer once for further use, the system dynamically generates the access layer when changes are made to the analytics or the schema.

The systems and methods described here can have some or all of the following benefits: extended data handling through dynamic caching from disk to memory-resident model; maintaining multiple versions of similar data, and flexible analytics through an extensible model.

These benefits are preferably provided in a system with high speed, high performance database access, including embedded analytics; high performance through memory-resident database and embedded analytics; and efficient storage and execution through "versioning" of the data. Unlike the use of typical stored procedures, calculated results appear as if part of the traditional database, but are in fact retrieved from the server cache or recalculated when required. Furthermore, calculated results can be extensive, including all records for entire calculated tables. Other features and advantages will become apparent from the following detailed description, drawings, and claims.

DETAILED DESCRIPTION

The systems and methods of the present invention are described in the context of business planning, and more particularly, in the context of supply chain management, but they are applicable to a much broader range of uses. The system employs a set of algorithms (referred to as analytics) to process data to provide desired information, such as calculated data that can predict future conditions. The system can be used, for example, for business planning, such as material requirements planning (MRP), which relates to planning what materials and components will be needed by a business in order to fill orders; and capable-to-promise (CTP) calculations for determining when a business can deliver products. Examples of business planning processes are described in U.S. application Ser. No. 10/438,932, published as 2003/0216952 on Nov. 20, 2003, which is incorporated herein by reference.

The system allows different versions of data records to be stored so that planning can include multiple scenarios. For example, a business might assume that a component that it uses will typically be delivered in three months; the business can also plan for the situation that would arise if that component were to be delivered in four months or two months. Such scenarios may be hypothetical for planning purposes or could also result from actual changes of circumstances, such as new delivery information from a supplier. Using such plans and different versions of data for different scenarios allows a business to better manage its ordering and inventory functions and improve planning for delivering its products.

Other uses for such plans and scenarios could include, for example, financial planning with a number of different factors that change over time where a number of "what-if" scenarios could be employed, such as scenarios for different interest rates, or for financial budgeting. Similarly, plans could include elements of an engineering design, to investigate the effects of different components on the performance of the design. While described in the context mainly of supply chain management, it should be understood that the systems and methods employed here can be used for other applications.

Figure 1:
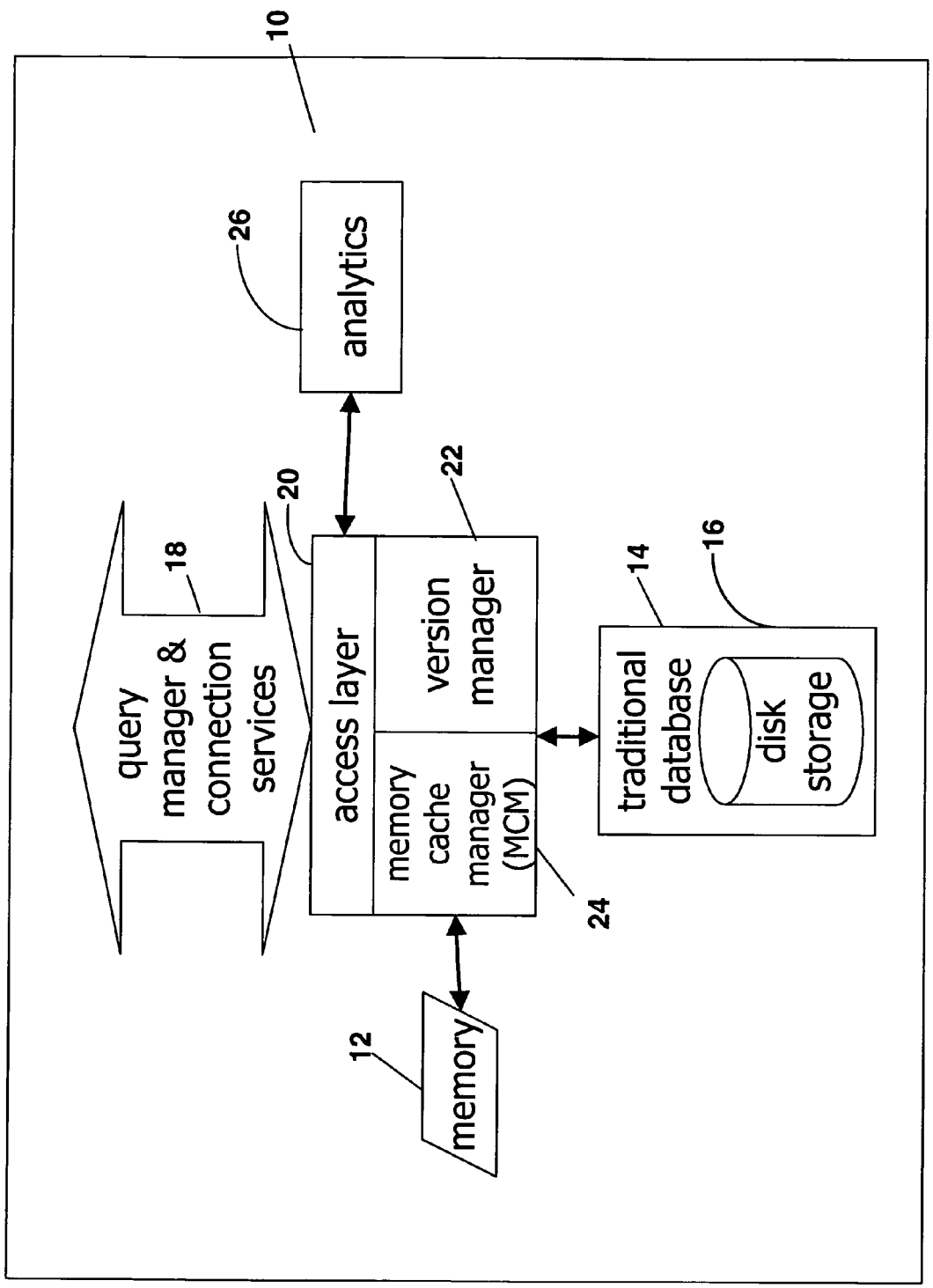
FIG. 1 is a block diagram of a server and disk system according to the present invention.

FIG. 1 shows a high level diagram of a system according to an embodiment of the invention. In a preferred implementation, the system includes a server 10 with caching server memory 12 and a database 14, preferably a relational database management system (RDBMS), as a backend data store for the system, e.g., with read/write disk storage 16. User and application interaction with the data in database 16 and memory 12 are provided through a query manager 18, an access layer 20, a version manager 22, a memory cache manager 24, and analytics 26. Information that the server needs to perform calculations can be stored permanently (i.e., persisted) in database 14 through server 10.

When input data is requested, if it is not already in server memory 12, it can be loaded on demand into server memory 12 from database 14. When calculated data is required, it is reported from server memory 12 if the required input data is in server memory. If not, the necessary input data is retrieved and the required analytic is run. The results are placed into server memory 12 and then reported to the user without having to be stored back into database 14. An alternative embodiment would have the server engine coupled with the software implementing the traditional database.

The invention includes systems and methods for storing and accessing data in ways that can reduce the number of interactions with backend database 14, while also keeping manageable the amount of data server 10 has to hold in server memory 12.

Figure 2:
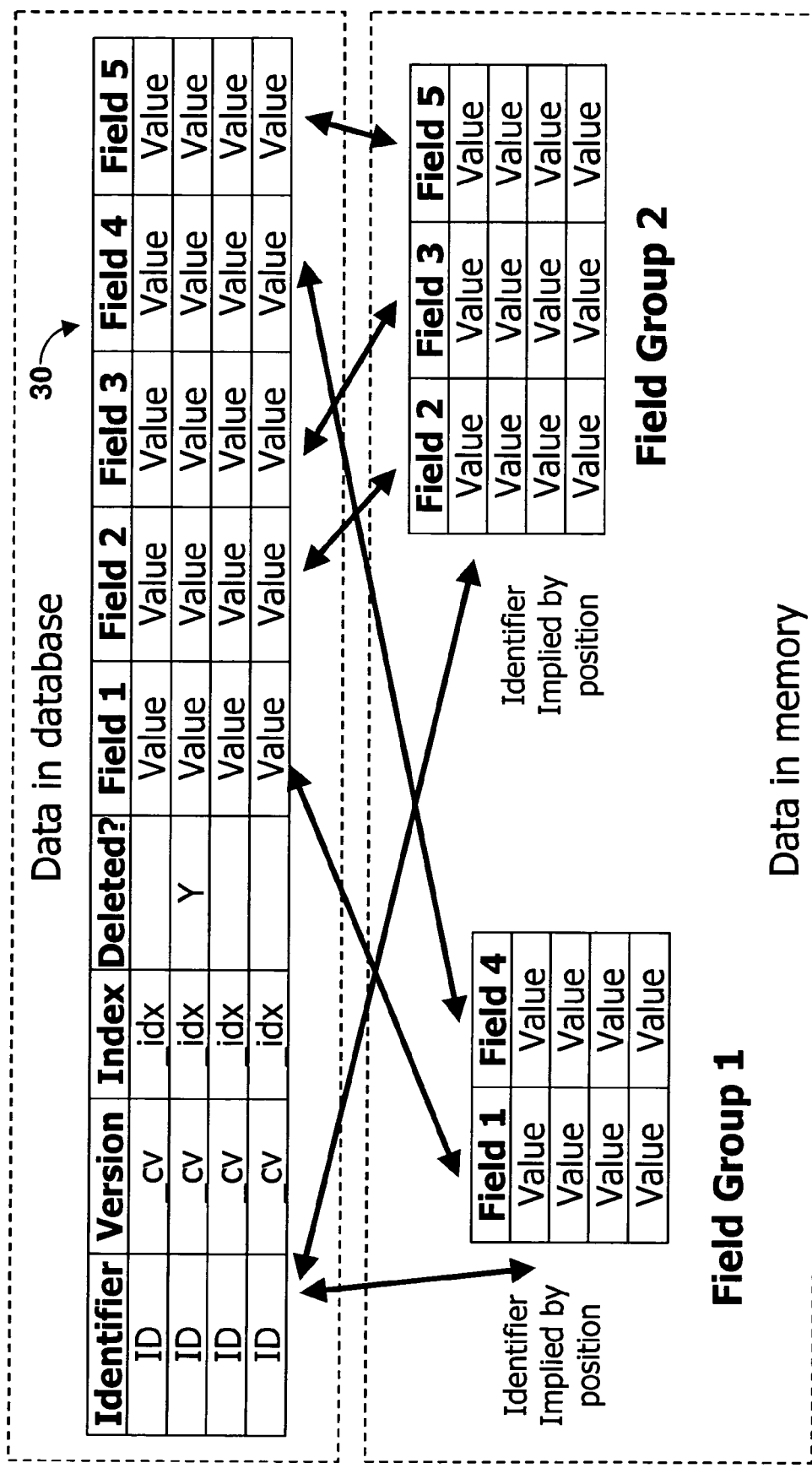
FIGS. 2-6 are block diagrams showing ways to arrange data according to the present invention.

FIGS. 2-6 show examples of embodiments relating to how data can be organized. Table 30 in FIG. 2 shows records as they are stored in database 14. These records are each given a unique (to a specific table) identifier (ID) that is independent of any keys defined by the user. The records include data fields, shown here as Field 1 through Field 5, with values that can be numeric quantities, text strings, dates, or other values. As discussed below, each record also has fields that help support versioning of the records, such as a version field and an index field.

The memory cache manager (FIG. 1) manages the allocation of the IDs; the IDs can be visible to the user but preferably are not modified. A unique ID for each item in the table is a basis for maintaining different versions of that record for different plans and for synchronizing the server memory data and the database data. One ID can be associated in the database with multiple versions of that item; i.e., one row can have an ID with one version for an item, and another row can have the same ID but with a different version of that same item.

The fields for each table are organized in the memory cache manager into one or more field groups, each with one or more fields, shown in FIG. 2 as Field Group 1 and Field Group 2. The data schema defines which fields are in the same field group, thereby allowing designers of the schema to define which fields are often used together. Every field is a member of one, and preferably only one, field group. In the example of FIG. 2, there are five fields with three fields in Field Group 1 and two fields in Field Group 2. The tables of field groups can, but do not need to, include IDs.

FIGS. 3-6 show how data from the database is arranged in server memory. When the server needs to access a field for a record, it loads all fields in the same field group for all records on a page. In a preferred implementation, there are 512 records per page. This granularity allows enough room on each processor memory page to store the initial record IDs, set field pointers to set pages 36, and some version nodes (nodes corresponding to versions of a record), as indicated at 38 and 40. Using page size blocks allows the memory manager to handle basic memory allocation efficiently. Different numbers of records for each page could be used, especially with system pages of different size.

Fields and field groups can be retrieved on an as-needed basis, thereby reducing the amount of data that needs to be stored in the server cache to make a calculation. For example, to use an analytic that determines when a manufactured product can be delivered based on the lead times for delivery of various components, the analytic may require quantity and delivery time information. A record, however, may include other information for other purposes, such as a product description, supplier address, or other information that may be particularly useful for reporting or for other purposes, but may not be needed to calculate when a manufactured part could be delivered. An analytic could require data from fields from several different field groups, in which case the multiple field groups would be loaded into server memory, while other field groups might not be loaded. Generally, it is desirable to group fields to reduce the need to retrieve more field groups.

As more version nodes are added, additional pages can be used to store further version nodes. As indicated in FIG. 3, a link field for each version node points to the next version node, and the link of the last version node in the chain points back to the original record ID on the base page.

Figure 3:
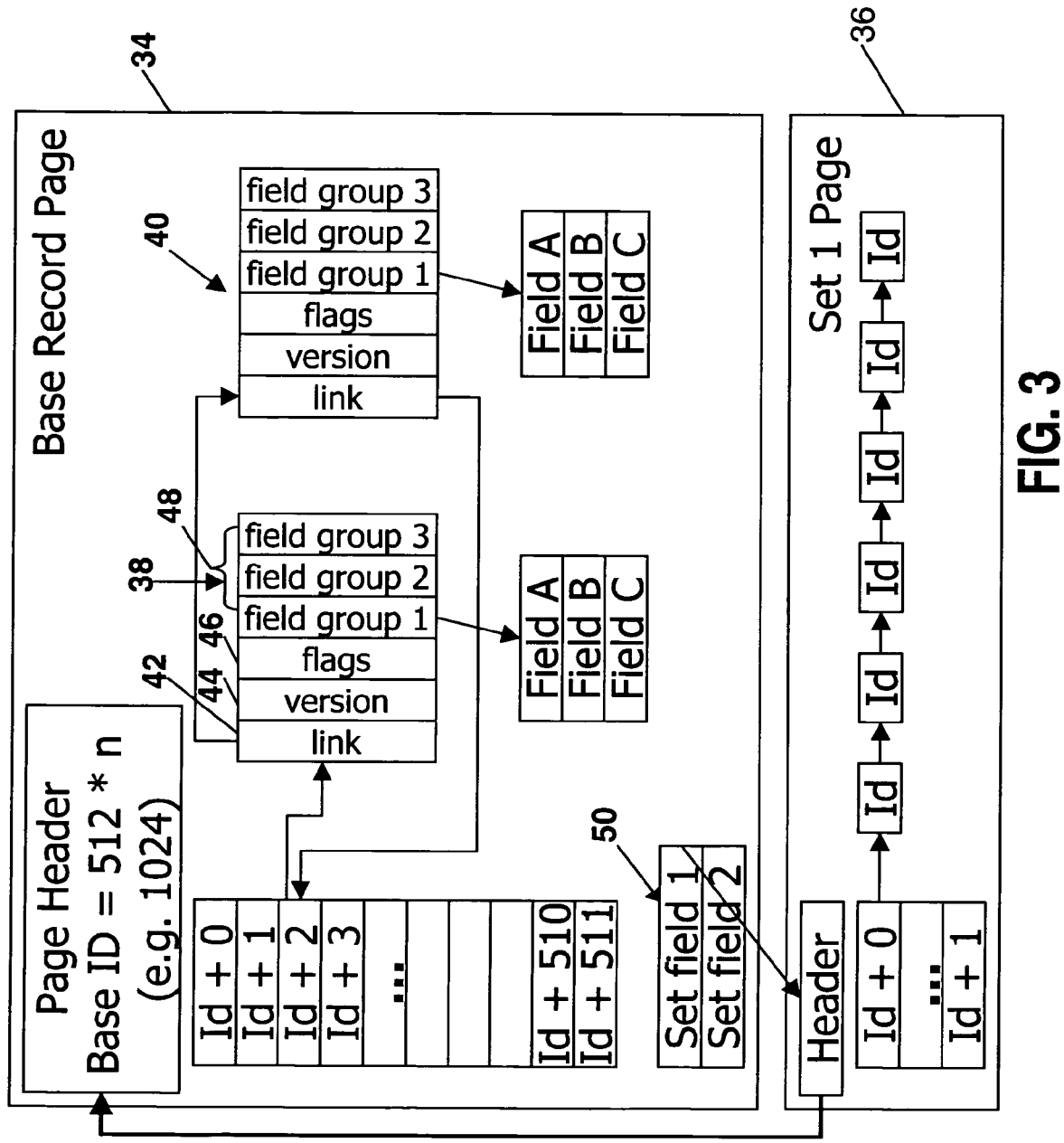
Figure 4:
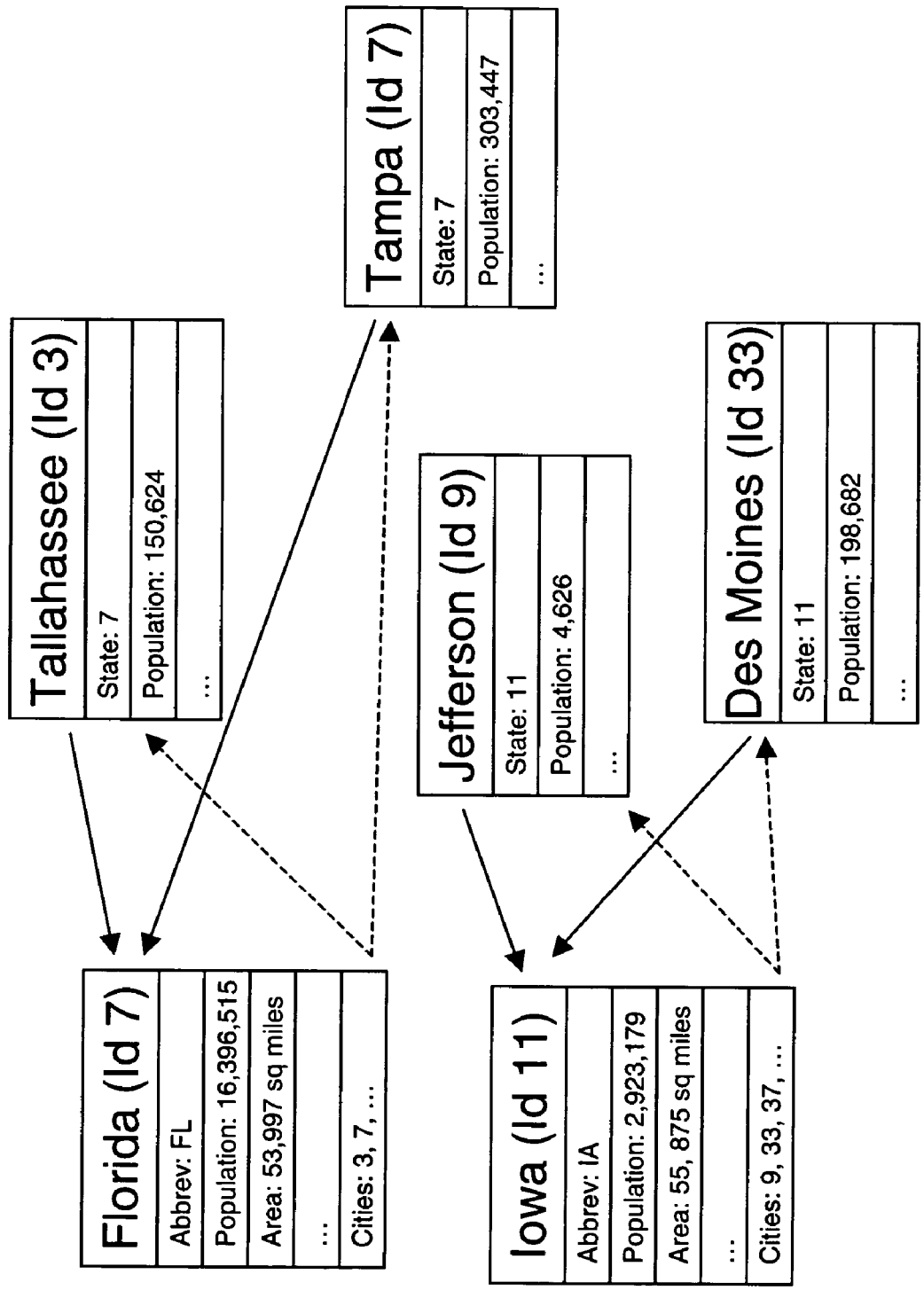

FIG. 3 shows a layout of records as they are cached in server memory, including a Base Record Page 34. The system stores references to other tables by ID, and enforces a partial ordering of references in the schema (i.e., preferably, there are no cycles allowed). Unlike traditional relational databases, there is no need for an explicit join operation when working with the server model. Instead, references can be followed directly in queries.

Base record page 34 has 512 IDs, each with a pointer to a link field of the first version node for that record. If there are additional version nodes, the link field of the first version node points to the link field of the second version node, which can point to a link field of the third version node, and so on. An indicator is used to show the latest version node such as by having the link field of the last version node point back to the ID. Each version node has a version field 44 to identify which version it is, a flag field 46, and field groups 48 (here, field groups 1, 2, and 3). As indicated here, field group 1 has Fields A, B, and C (fields for other field groups are not shown).

Each reference field can be used to produce, as needed, an inverse set field 50, which points to a set page 36, as shown in FIG. 3. An example of references and sets is set out in FIGS. 4 and 5. This simple database schema has two tables: state and city. The city table has a reference to the identifier of the state it is in. Each state has a set of cities that reference that state. In the server, the reference fields (shown by the solid lines) are stored persistently in the database using the identifier of the target record. The set fields (shown by the dotted lines) are not stored persistently, but are calculated on demand.

Figure 5:
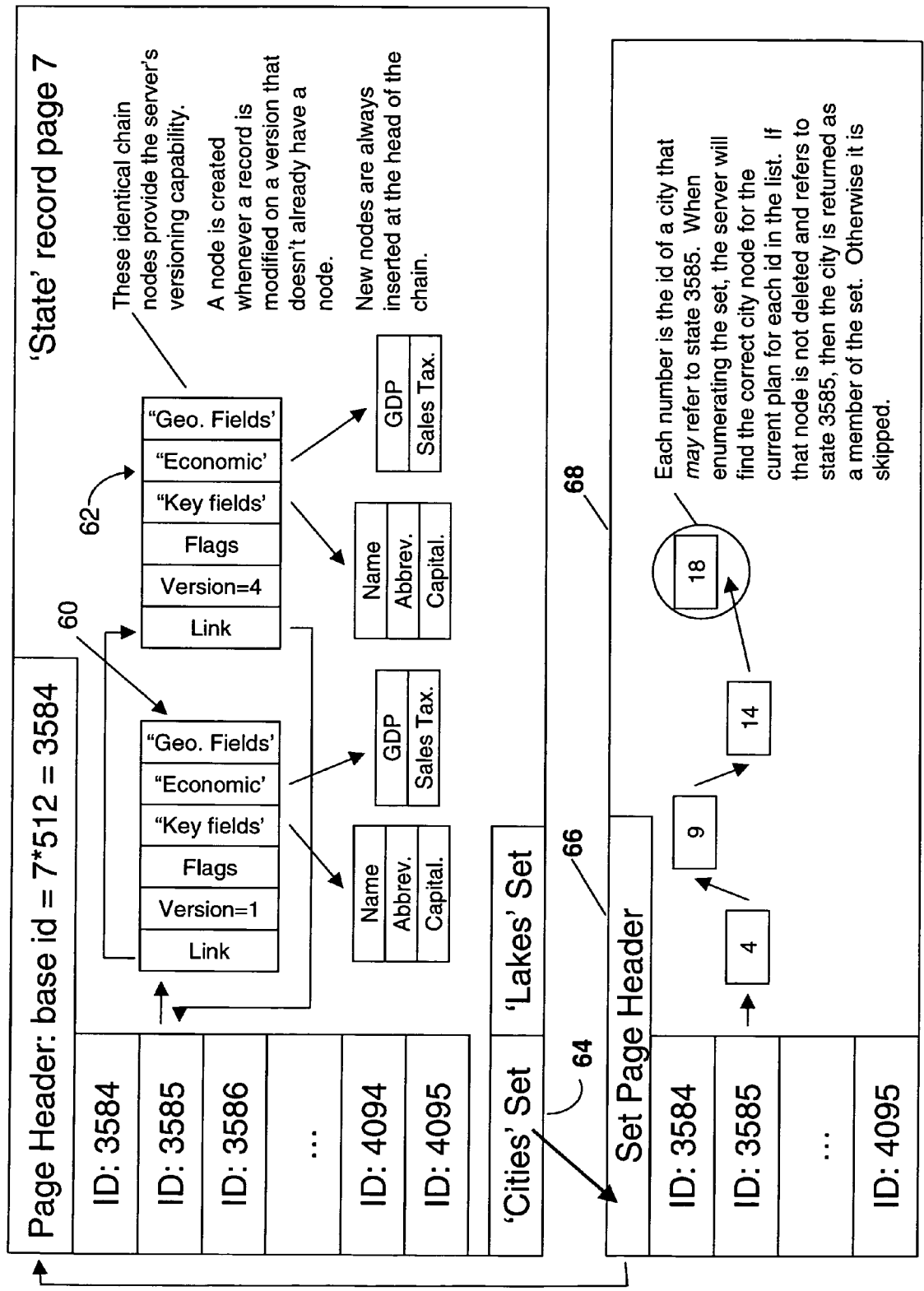

As indicated in the example in FIG. 5, there can be a number of record pages. What is shown in FIG. 5 is the seventh page, which begins at ID 3584 (which is 512 times 7), and has up to ID 4095. ID 3585, for example, has two version nodes for the data, identified here as version 1 (node 60) and version 4 (node 62). Within each version node, there are a number of field groups, such as "key fields," which includes the name, abbreviation of the state, and the state capital; and "economic," which includes GDP and sales tax rate. These identical chain nodes provide the server's versioning capability. A node is created whenever a record is modified on a version that does not already have a node. New nodes are inserted at the head of the chain.

As indicated here, the state record page includes an inverse cities set pointer 64 that points to a set page header 66 of a set page 68. For ID 3585 in the cities set page, there is a pointer to the identifier for each city that may refer to the state with ID 3585. Each number is the ID of a city that may refer to state 3585. When enumerating the set, the server will find the correct city node for the current plan for each ID in the list. If that node is not deleted and refers to the state with ID 3585, then the city is returned as a member of the set. Otherwise it is skipped.

Figure 6:
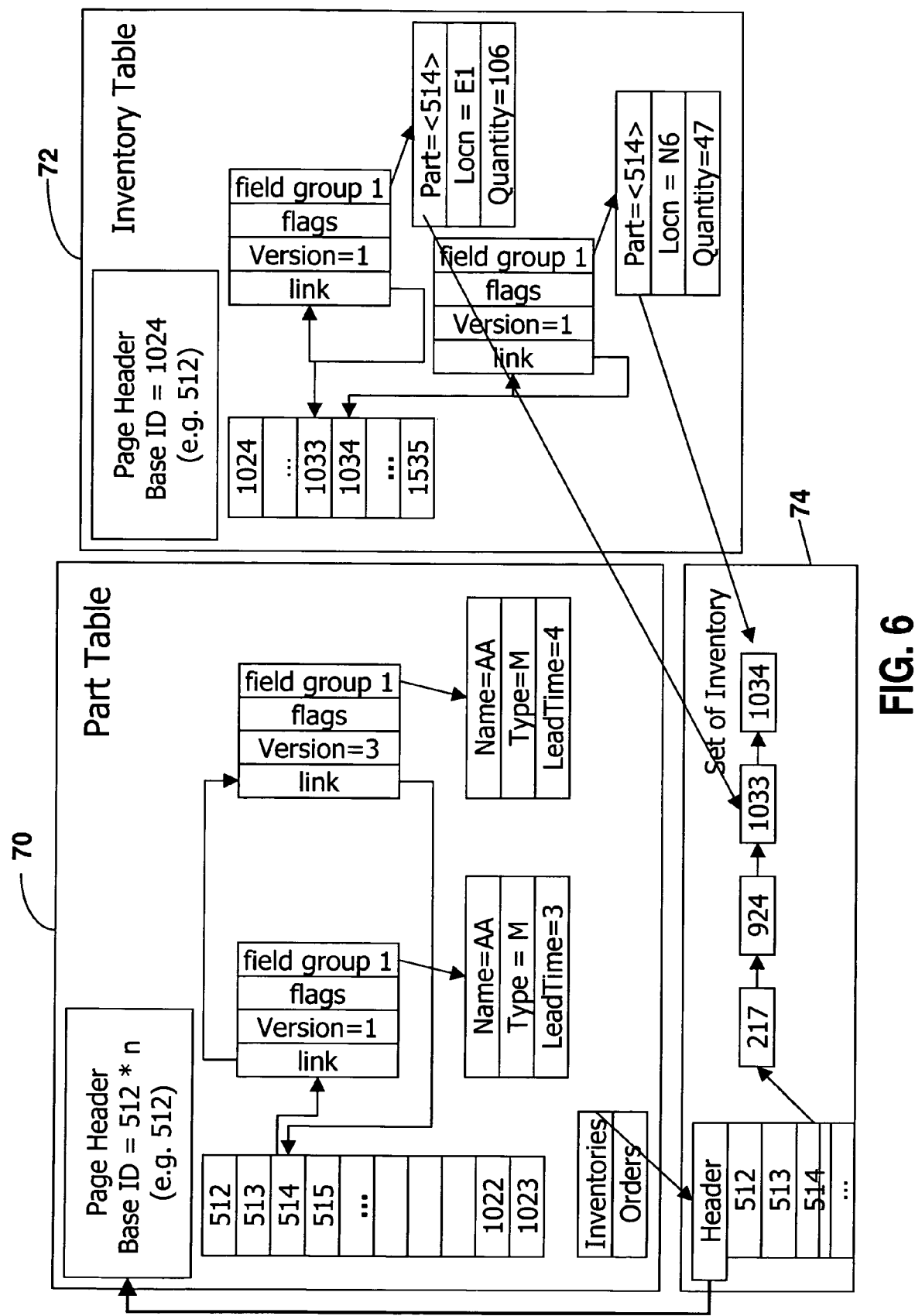

FIG. 6 shows another example of data and how it can be organized and maintained. This example includes a Part Table 70, an Inventory Table 72, and a Set of Inventory 74 as an inverse to Part Table 70. As shown in Part Table 70, an ID 514 (i.e., from a second page) has links to two versions, referred to here as version 1 and version 3. In each case, the version has a field group 1, with fields for the part name, part type, and a lead time expressed in some unit of time, such as months. The difference between the two versions is that the lead time has been changed for version 3 versus version 1. This difference could result from actual changes in information or possibly due to a what-if scenario entered by a user. This difference allows one to calculate different business processes based on this different input, e.g., how much inventory to keep on-hand with a different lead time, when to order new materials, and when a product could be delivered. For the particular analytic, the lead time may have been the only data needed for a calculation, so other field groups would not have been loaded into server memory.

Inventory Table 72 includes two IDs, 1033 and 1034, each of which is shown pointing to a single version, and each of which refers to the part identified as part number 514. Part Table 70 and Inventory Table 72 are cross referenced in the Set of Inventory 74, which lists the part IDs that are pointed to by an applicable inventory ID. The inverse set is maintained by the server. Information about set membership is dynamically loaded and cached in the same way as input fields are. Set membership is calculated for all records in a page at once. For example, if the server needs to use the set of supply orders for a particular part, it will calculate that information for all parts on the same page. Set information is retrieved directly from the database without loading the whole supply order table into the server. Additional set pages are claimed if the set page becomes full of referencing nodes.

Referring back to FIG. 1, memory cache manager (MCM) 24 can manage its server memory 12 by discarding pages that it has loaded in the past from database 14 but which it no longer needs. MCM 24 does this by maintaining a partial list of "most recently used" pages/field groups in memory and discarding the oldest of these when it needs additional memory for accessing new record/field groups.

Before discarding memory, MCM 24 checks to prevent any candidate pages being freed that are currently in use by any active analytic or user code. This is done using a technique similar to a conventional mark-and-sweep garbage collector. MCM 24 stops all the other threads that are running in the process and scans through memory to identify and mark active records. Each record object in analytic memory includes a special bit pattern that flags it as a record object. Therefore, the search includes scanning analytic memory to locate record objects and the page that record is on. The result of this search is a set of record pages that must not be thrown away because they may be in use. The collector may falsely identify pages as being in use and mark them for non-removal, but that is an acceptable trade-off. It is therefore important to choose a bit pattern that is unlikely to otherwise occur. In the preferred implementation, the match is assumed to be valid and its referenced memory is checked to determine whether it is a valid candidate page. If not, the match is ignored.

As memory is freed up by deleting unmarked blocks, each available block is added to a list of free memory (by size) so that it can be reused next time a block that size is required. A pool of available memory is maintained by MCM 24. When the pool is determined to be excessively large, part of it is freed back to the operating system. When more memory is needed, it is requested from the operating system.

Figure 7:
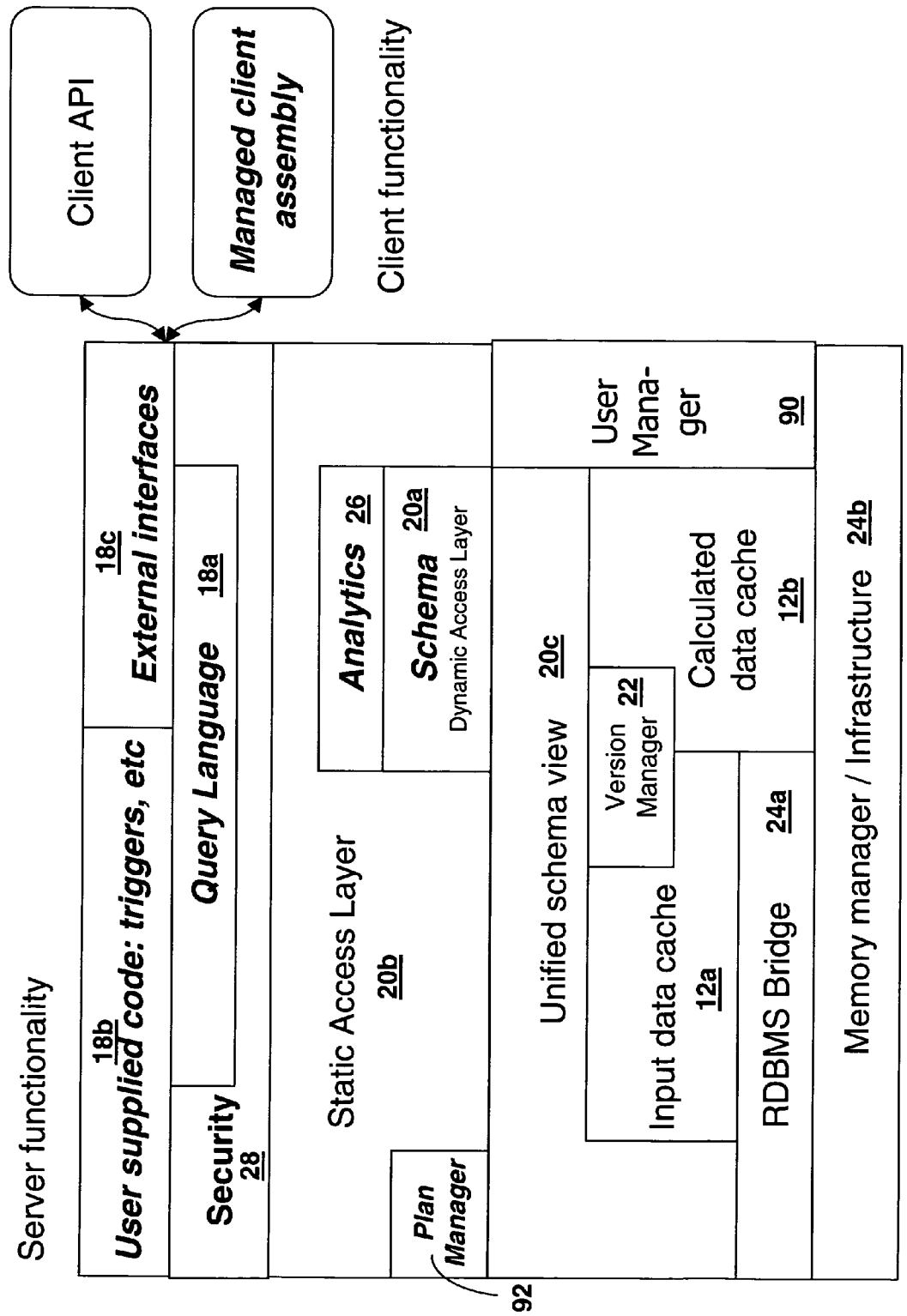
FIG. 7 is a diagram of the server according to the present invention.

Referring to FIG. 7, the elements of the server and how they interact are shown in more detail than in FIG. 1. As shown in FIG. 7, blocks in boldface are implemented in this embodiment in managed code; i.e., code that is executed by the common language runtime (CLR) environment of the .NET framework. Server memory 12 (FIG. 1) is represented as input data cache 12a and calculated data cache 12b. These are shown as different blocks, but can be part of the same or different physical memory. Memory cache manager 24 is shown as an RDBMS bridge 24a and a memory manager 24b.

Access Layer 20 (FIG. 1) includes a unified schema view (20c), dynamic access layer (20a) and static access layer (20b). Unified schema view 20c presents a common interface to both input and calculated portions of the schema, and is the interface that other levels of the server are built on top of. Dynamic schema layer 20a represents a managed code assembly that is generated at run time to present the database schema as a set of .NET classes. Static access layer 20b includes a managed assembly that provides a late binding interface to the schema. It provides interfaces for schema discovery and manipulation as well as data access. Analytics 26 are written using the classes exposed by dynamic access layer 20a. The access layer is described in more detail below.

The query handler 18a is written against static access layer 20b since, unlike analytics, the query handler does not know anything about the data model it is running against ahead of time. This handler generally performs a function similar to that in the current product.

User supplied code 18b, which can include user-created analytics or other code, runs on top of the facilities provided by the server and can use either static access layer 20b, query handler 18a, or dynamic access layer 20a as is appropriate given the function it is fulfilling.

Version manager 22 is conceptually similar to the version manager in the current product; it is responsible for maintaining information about the different scenarios visible to the users. It implements the functionality required for the basic plan operations, such as create, delete, commit, update, and publish.

Security layer 28 enforces access control rules for the schema. The database administrator can restrict a user's access to different portions of the schema either on a whole table basis or column by column. It is also possible to enforce a filtered view of a table (i.e., row based security).

A user manager 90 maintains information about the users, user groups and group membership within the system. A plan manager 92, which is independent of the precise data model used, handles how a user interacts with versioning. These managers are generally similar to those in the currently available product.

The external interfaces 18c expose the functionality of the server to clients running on remote systems. In the preferred implementation, the primary external interface uses SOAP based web services. In addition, other interfaces, including ADO.NET, COM, and RPC can be included for either internal or external access. These interfaces are generally similar to those available in the currently available product, and are described in more detail in conjunction with FIG. 9.

Storing Versions

Figure 8:
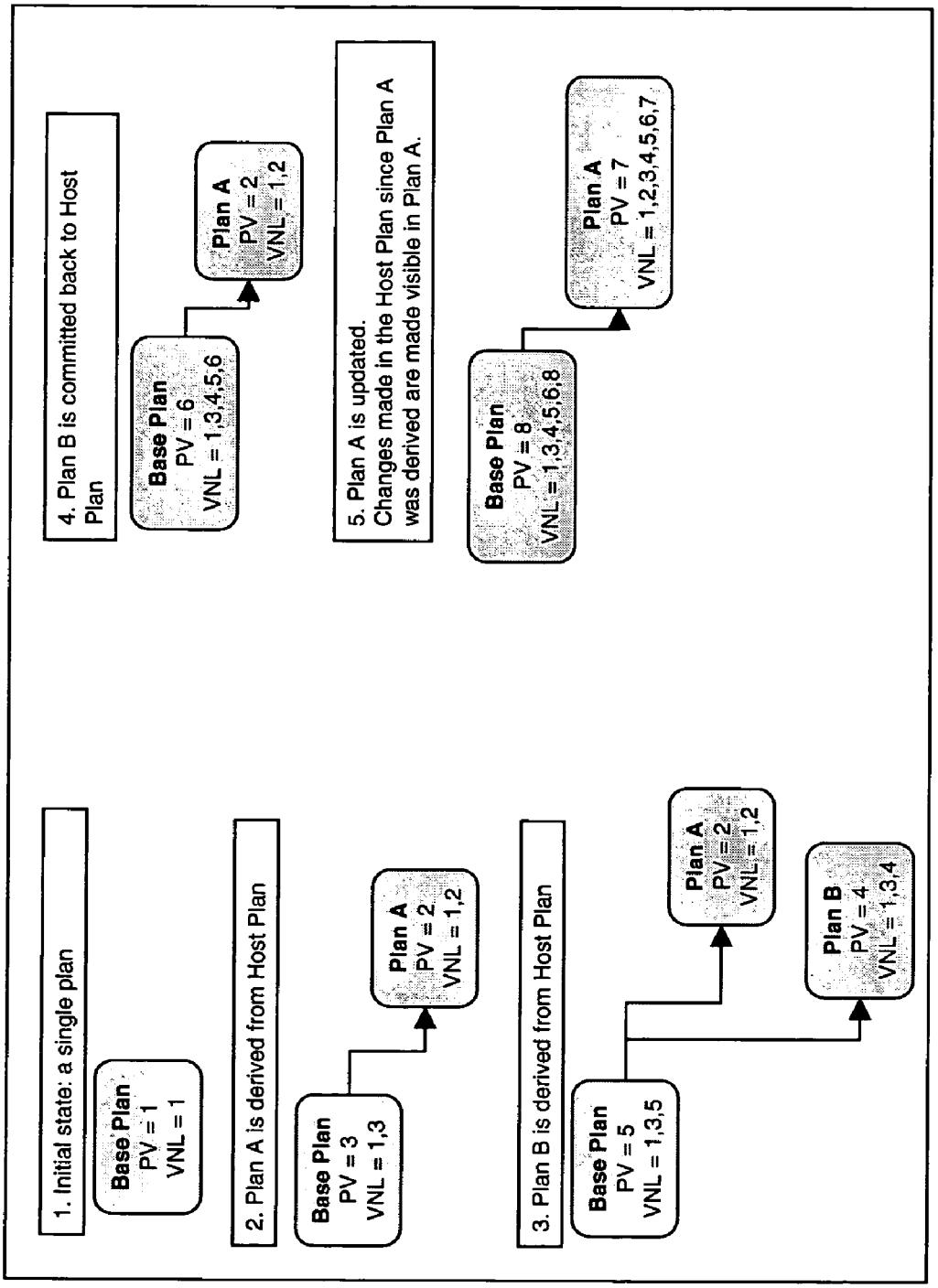
FIG. 8 is chart illustrating versioned plans.

FIG. 8 illustrates how plans are built up out of version numbers, and how a version number list (VNL) changes with plan operations.

The version manager presents a rich versioned data model to the access layer. The server exposes versions to users via the concept of a plan. Access to data is made within the context of a plan. Plans form a partially ordered hierarchy, and changes to one plan do not automatically affect the data visible in other plans. Users and/or applications may derive new plans from existing ones. There is a root plan that may contain an initial data set or may be empty.

Internally the version manager implements versioning by storing multiple versions of individual records in the database. A plan has a set of versions that are visible to it in a set called a version number list (VNL). The VNL is conceptually unordered. The version manager is responsible for maintaining the VNLs for each plan as the user (or other application) manipulates the data. Each plan also has a single prime version (PV). The PV is a member of the VNL but represents the most recent version of the plan (note that the PV equals the highest number in the VNL for a plan). When changes are made to a plan the new version node is tagged with the plan's PV.

As shown also in FIG. 3, each record has a chain of version nodes. These nodes all share the same record identity (ID), but represent the state of the record in different versions. The nodes specify which version they were created on and have a flag to indicate if the node represents a deleted record in that version. A record that has had no changes will have a single version node. The version manager automatically resolves which record node to retrieve based on the plan being accessed and the VNL for that plan. The most recent node (that is, the first matching node found by following the chain of nodes, since the version pointer always points to the PV and new nodes are inserted at the beginning of the list) with a version matching any entry in the VNL is the active version of that record for the plan.

When a change is made to a record, a new node is created. The new node includes all fields in the record. Thus, all versions of the records contained on a page are accessible from that page. A child plan can be updated if records are changed in its parent (or committed to its parent) after it was derived.

An existing plan can be committed back to its parent, merging the changes made in the child plan back into the parent plan, as shown for example in steps 3 and 4 of FIG. 8, where the base plan now includes changes to child plan B. Plans thereby also provide a transaction mechanism for making multiple changes visible atomically in the parent.

A child plan can be updated to bring down changes made in its parent subsequent to the child's creation. The parent VNL is simply added to the existing child VNL, and new versions are assigned to both the parent and child plan and become the PV for those plans, as shown in step 5 in FIG. 8.

The server has rules for resolving conflicts that may arise because of changes made in both the parent and the child. Before it can be committed back to its parent, a child plan should be up to date, i.e., all changes in the parent VNL have been brought down into the child plan VNL, effectively merging the changes.

Conflicts that arise due to versioning include modification conflicts, deletion conflicts, and insertion conflicts. They are resolved in accordance with a set of rules such as those indicated below.

A modification conflict occurs when a record has been modified in both the parent and child versions. If the modifications occurred on different fields, then the record in the updated plan will contain the changes from both the parent and child versions. A new node for the record will be created in the child plan using the updated PV for the child. If the same field has been modified in both the child and parent, then the parent's change is not brought down into the updated child version. Rather the field value in the child version remains.

A deletion conflict occurs when a record has been modified in either the parent or child plan and deleted in the other. In the exemplary rules here, a deletion wins out over a modification. In other words, if a record is deleted in either the parent or child, it will be deleted in the updated child. If the deletion was in the parent plan, then a new delete node is created in the child plan, using its update PV.

An insertion conflict occurs when both the parent and child plan have newly inserted records with primary keys that conflict. This conflict is resolved by merging the two records (that is, merging the two sets of linked nodes), and creating a new version of the record in the child plan (using its update PV). This is the only time that a record's identity may change.

The preferred implementation of the invention tracks all sets of references in a single version independent list. When running queries against the sets of references, the version manager resolves which elements of the set are valid for the plan used by the query.

The versioning as set out in FIG. 8 and the conflict resolution described above are implemented in a similar way in the currently available product by Webplan Inc. The implementation as used with a database 14 (FIG. 1), however, is not in the current product.

The backend database 14 (FIG. 1) in the embodiment of the present invention need not be aware of any versioning concepts, and thus requires no modifications. The version manager can store information used to implement versioning as normal fields in database 14. An input table in the server data model is mapped to a table in database 14, and each input field on the table is mapped to a column on the database table.

Referring to FIG. 2, in addition to data Field 1 through Field 5, each table preferably has four extra fields stored in database 14 to help support versioning:

a unique integer key used to establish record identity (_id)
a creation version of a node (_cv)
an index used to construct the identical chain (_idx)
flag used to identify records that mark deletions (_deleted)

The primary key for a table in the database is (_id, _cv). The _idx field is used to construct the version node chains correctly when data is retrieved from the database, as shown, e.g., in FIGS. 3, 5 and 6. There is no ordering implied by the numeric values of the _cv fields. Rather, ordering of version nodes is reconstructed using the _idx field. The process for finding which particular node is visible to a given plan is to start at the head of the record chain and progress down it until a record is found whose creation version is present in the plan's VNL. That matching node is then presented to the access layer.

Version Compare

The rich versioned data model presented by the version manager makes it easier to calculate differences between any number of versions of the data. Each multi-version query identifies fields to treat as key values for the query and selects the data versions the query is to be applied to. The query language process replicates the query against each selected version. The query against each version runs analytics and retrieves data as may be required. The query language then merges data from each query with matching key fields. The result is a virtual record containing the key values plus the individual fields for each result from each version. Each virtual record is then presented to the query interface.

Version Reclaim

Server 10 needs to allocate new versions only as the user performs plan operations. As data is modified, new version nodes are created. The server works with a number of versions internally to provide high performance. The server implements a process referred to here as "version reclaim" to allow it to reclaim previously used version numbers and identical chain nodes that are no longer needed.

The process can include three phases:

1. Identify version numbers that are no longer in use. This occurs when a user derives a new plan, causing it to be allocated a version number, and then deletes that plan. Since the plan is no longer visible to the user, any version number that was unique to it is no longer visible.

2. Identify which version numbers are now equivalent. FIG. 8 shows how version numbers are allocated in response to plan operations. The version number lists associated with a plan can rapidly grow large. If a plan has versions 1, 2, 3, 5, 7, 9 and version 3, 5, and 7 are only visible to that plan and no other, then these three versions can be collapsed to a single version (it does not matter which).

3. Given the results of phases 1 and 2, the server creates a mapping for each version number. A version number will either be marked as deleted (from phase 1), mapped to an equivalent (phase 2), or left as is. The server then examines each node on each identical chain in the database and applies the processing described below.

For each node the server updates the version number of the node with the new result from the mapping it constructed. If the version represents a deleted version then the node is removed from the identical chain. Once the chain has been updated a second pass is run to look for nodes that now have the same version number. The server only keeps the first node that has a given version number on each chain. Subsequent nodes are invisible to the outside world and can be safely deleted. If a chain is reduced to a set of nodes that are all deleted then the entire chain can be removed from the database.

Once this process has been completed, all the version numbers that were either marked as deleted or mapped to another version are returned to the pool of free version numbers maintained by the server.

Access Layer

Referring again to FIGS. 1 and 7, a feature of server 10 is how it presents its data model to applications, whether they are for internal analytics or for external systems. The preferred implementation of server 10 is built on technologies provided by Microsoft's .NET framework to provide an intuitive data access layer that includes dynamic access layer 20a, static access layer 20b, and unified schema view 20c. Other technologies (such as Java technology) that can provide similar capability to dynamically load programs could also be used.

The static access layer 20b is a managed assembly that defines a set of interfaces for schema level objects, including the schema itself, namespaces, tables, fields, locales, and algorithms. These interfaces allow code to retrieve information about the objects and the data they manage. For example, the table interface has methods for querying the fields on the tables and retrieving the collection of records that make up the table, and the field interface has methods for reading and writing data. The static access layer interface is not dependent on the data model defined in the server in any way. Other layers of code, for example, query language handler 18a, can use static access layer 20b to interact with the data without having to have any a priori knowledge of the data model.

Dynamic access layer 20a is a dynamically generated managed assembly that defines a set of classes that model the defined database schema with properties corresponding to the fields in the table. For example, if there is a part table with a description field, there will be a part class that has a description property. The dynamic access layer uses the concepts of namespaces (see more discussion below) and defines a common language runtime (CLR) namespace for each namespace defined in the schema. The classes defined in each CLR namespace represent the tables visible in the database namespace, and have properties corresponding to fields that are visible in that namespace. Dynamic access layer 20*a* also defines result objects for each analytic defined in the schema. The user supplied code that implements the analytics inherits from these classes in order to be able to provide the calculated results.

Dynamic access layer 20*a* creates instances of the schema level objects declared in the static access layer 20*b*. For each table in the database, dynamic access layer 20*a* derives a class from the table object defined in the static access layer. This concrete class provides an implementation of the table object that work for the specific table. Objects are likewise created for fields, algorithms, namespaces, and locales.

Dynamic access layer 20*a* presents a set of binding points that are places that user supplied code must be hooked into at runtime to implement analytics and calculated properties. These binding points are defined as NET delegate objects and the static access layer 20*b* is responsible for connecting the two together.

The data model provided by the server includes an input data model of values that are stored in the database, and a calculated data model for values that are computed at runtime to generate calculated results for analytics.

Unified schema view 20*c* is a layer entirely internal to the server. It represents the top level of unmanaged code and defines table and field abstractions that are common to both the input data and calculated data schemas. The same mechanisms can be used to access both input data in input data cache 12*a* and calculated data in calculated data cache 12*b*. Without querying metadata it can be unknown whether a field is an input field or a calculated field; other than to change data, there may be no need for applications or analytics to know the difference.

Namespaces

Server 10 supports namespaces within the data model. The server is provided with a base data model, but is adaptable by (or for) the user so that the data model can be extended by adding new fields or even new tables to meet the needs of an application. This is one of the ways in which the system described here provides a framework with flexibility for the user to add to the system.

A problem can arise if there is a new release of the core data model. For example, a user could have added a field, Zot, to a table, Foo; in the next data model release the base data model could be extended to include a field with the name Zot, but with a different meaning, and potentially with a different type. This situation could cause a problem when a user tries to upgrade, because the user would have to rename the existing field, causing existing applications to break.

Namespacing addresses this issue by providing a way to distinguish between different portions of the schema that are conceptually independent. A namespace is defined for each organization that may make independent changes to the schema. Typically there would be three namespaces: one for a core server, one for an application partner providing customization, and one for an end user. Different numbers of namespaces could be used without altering the design concept. These namespaces are organized into a hierarchy (the number of namespaces and their specific names chosen are for example only). In this example, server is the lowest namespace, partner is intermediate, and customer (end user) is the highest.

Each table and field in the schema belongs to a single namespace. This relationship is shown using a namespace qualified name that takes the form namespace:table or namespace:field (the table may be defined by context). For example, Server:Part refers to the part table defined in the server namespace; see also Server:PSCumLeadTime in the code example below.

Tables and fields are visible in the namespace they are defined in, and in higher namespaces in the hierarchy. But a table or field may be renamed at a higher level to resolve conflicts. For example, in the case given above, during the upgrade process the customer would rename the new Server: Foo field to Customer:Foo2 in the customer namespace. The original Customer:Foo field would be unaffected.

Queries and user code are run within the context of a particular namespace. Queries and applications run at one level can only see the portion of the schema defined in that namespace or as defined in lower level namespaces.

In this example, server analytics that rely on Server:Foo would run using the server namespace and see the new field. Customer software would continue to access its existing field as Customer:Foo and would access the new field as Customer:Foo2.

Analytics

A calculated data model can include simple properties and/or analytics. The simple properties are user supplied code that is executed on demand to compute a value; for example, computing the distance between two points. User supplied analytic are run to generate the values for a number of calculated fields and tables at once. Server 10 caches the results of commonly used analytics in memory 12; for example, generating all the planned orders for a particular part.

The clients of the data access layer can be applications and application programmers who are typically writing business logic on top of the data model. They typically interact closely with the data model.

In a traditional database environment all data interactions are done by queries, typically on results that have been calculated. That is, first the calculation is made and results are stored back into the database, then the results are queried. Business logic is typically either written directly in a query language (e.g., SQL) or externally using any programming language through a data access layer that lets the programmer write queries and manipulate the results. The access layer is written and compiled when the schema is defined. If there are changes, code is rewritten later and the access layer is re-compiled.

In a preferred implementation of the present invention, business logic written for the server is implemented as managed code and supplied as a .NET assembly, which allows managed code to be added without recompiling at each stage. Server 10 hosts the business logic within its process address space by hosting the Common Language Runtime (CLR) that provides the execution environment for managed code. For example, if there is a Part Table with a description field, there will be a part class that has a description property. Fields in a table are exposed this way through the access layer, whether they are input fields or calculated fields. User defined calculated properties can be defined as taking arguments. For example, on a bill-of-material table, the user can define a boolean valued IsEffectiveOn field that takes a date as an argument. Code that is running within server 10 accesses this object model to obtain data in the desired field. This applies to analytics, user defined properties, stored procedures, and triggers.

The namespaces defined in the schema are reflected in the data access layer as .NET namespaces. This allows a single data access assembly to present multiple views of the data model. For example, server-supplied analytics use the server namespace in the data access assembly, whereas user written stored procedures use the customer namespace.

Results of analytic business logic are themselves managed by memory cache manager 24 (FIG. 1). If input data is not changed in a plan, then the cached results are valid and are retained until discarded by memory cache manager 24. When input data, whether used directly or indirectly by cached results, is changed in a plan, then the cached calculated results are invalidated and their corresponding memory is freed. The input data itself can be modified and written back to the database as the cache is preferably a write-through memory.

The implementation of the access layer can be fully dynamic. The access layer is regenerated every time the server starts and whenever the schema is changed. As part of the initialization process, the server generates a list of binding requests that are used to match user supplied code, including analytics, with the correct parts of the schema that will be used by the user supplied code. The binding requests are identified by the analytic name (which is namespace qualified) or the property name consisting of a fully qualified table name and a fully qualified field name. There is a binding request for every user defined property and analytic.

The user supplies managed assemblies that implement user defined properties and analytics. These assemblies are registered in database 14. The user's code uses .NET attributes to annotate the methods that implement properties and analytics that are part of the schema. At runtime the server retrieves these assemblies from the database and scans them for attributes that match the list of binding requests it is trying to fulfill. When a match is found, the server generates a delegate to bind the user's code to the corresponding methods in the data access layer.

Static access assembly 20b is responsible for scanning the registered user assemblies and looking for types or methods that have been annotated by the user with attributes to indicate that they should be used to fulfill the binding requests. Analytics are tagged with an "Engine.Analytic" attribute. This attribute takes a parameter specifying the name of the analytic. Property fields are tagged by static methods and tagged with a "UserProperty" attribute.

When the static access assembly finds a method that fulfils a binding request it creates a delegate object that can be used to call that method and passes this back to the dynamic access assembly. The dynamic access assembly will invoke this delegate at runtime when the value of the field is needed.

The following code snippet, written in C# with some parts elided for brevity, shows how an analytic (part source cumulative lead time, PSCumLeadTime) is implemented using the access layer, and also how the method is tagged with a custom attribute to allow it to be bound to the analytic defined in the schema. The binding is triggered by the first line in the example.

```
[Server.Engine.Analytic("Server:PSCumLeadTime")]
public class CalcPSCumLeadTime : PSCumLeadTimeResults
{
    public override void Calculate( )
    {
```

-continued

```
        BillOfMaterial bom = this.Owner;
        // there may be a recursive analytic exception thrown
        try
        {
            Part component = bom.Component;
            double cum_lt = 0;
            // does this bill even get used?
            if ( bom.QuantityPer != 0 &&
                bom.EffectiveInDate.IsUndefined == false
                    component.Type.ProcessingRule !=
                    PartTypeProcessingRule.Ignore )
            {
                BOMType bom_type = bom.Type;
                // okay, the bill is going to be used ... get the basic values
                double offset = (bom_type.UseLeadTimeOffset == true) ?
                            bom.LeadTimeOffset : 0;
                cum_lt = component.CumLeadTime – offset;
                // will the demand skip through the component (phantom)?
                if ( bom_type.BlowThrough == true || ... )
                {
                    if (component.Type.UseLeadTimeAdjust == true)
                    {
                        cum_lt –= component.LeadTimeAdjust;
                    }
                    PartSource pps = component.PrimaryPartSource;
                    if ( pps != null )
                    {
                        if( pps.OrderPolicy.UseFixedLeadTime == true)
                        {
                            cum_lt –= pps.FixedLeadTime;
                        }
                        if( pps.OrderPolicy.UseVarLeadTime == true)
                        {
                            double avg_qty = component.AverageQty;
                            if ( avg_qty <= 0.0F )
                            {
                                avg_qty = pps.MinimumQty;
                                ...
                            }
                            cum_lt –= ( pps.VarLeadTime * avg_qty );
                        }
                    }
                }
                this.CumLeadTime = (float) cum_lt;
            }
            catch ( Webplan.Engine.RecursiveAnalyticException)
            {
                // hit a recursive situation. Set the scalar values.
                this.CumLeadTime = 0;
            }
        }
```

When server 10 runs an analytic that produces result fields or rows for a calculated table, the server caches the calculated result in the calculated results cache of server memory 12 without writing back to database 14. If the input data is modified, it can be changed in the input data cache and is then also changed in database 14. However, the results can be re-calculated in the server and returned more quickly than they would be if the analytic had to be re-run with a new set of input data retrieved from database 14. The calculated results stored in server memory 12 can also be quickly viewed and compared.

Calculated results can be discarded from memory 12 if the server needs to free up some memory for newer calculated results, or if the user changes input data that invalidates the calculated results. When the server needs to free up memory to make room for more calculated results, it bases the decision about which results to throw away based on how long it has been since the results were last used. Results that were used recently are likely to be reused shortly, and should be kept in preference to results that have not been used for a longer period of time.

The server supports a number of models for invalidating calculated results due to input data changes. One of these models can be selected on a per-analytic basis.

1. Global invalidation. Any change to any data in a particular plan causes all calculated results to be thrown away for that plan. The advantage of this approach is that it is always correct and it is easy to implement at runtime. The disadvantage is that it may throw away far more results than are actually being invalidated by the data change. This approach has been used previously in a currently available product.

2. Table based invalidation. This option change is a refinement of global invalidation. Analytics can specify which tables they rely on, and only changes to input data in those tables cause data to be thrown away for the analytic.

3. Selective Invalidation. This option is more complex. The analytic is responsible for describing all the data paths that it relies on; the server will only invalidate through those paths. An advantage of this approach is that much less data is invalidated for a given change, but the runtime cost of doing the invalidation is much higher. For example, to implement selective invalidation, an analytic that calculates the cumulative lead time for a part will declare that it uses the Part.LeadTime field and information about its component's lead time. Therefore, any change to the LeadTime for a part, or any change to a lead time for any component (or components of components, etc.) will invalidate the cumulative lead time for the part.

Semantic Types

The server provides a rich environment for developing data centric applications. One aspect of this is providing a richer set of data types within the data model. These types extended the traditional definition of a data type. Certain specific types defined in the preferred implementation are detailed below. The model can be extended to include other types that may be commonly required for additional applications.

Calendars

The server provides built-in support for defining calendars. A calendar is defined as a set of periods (typically days, but may include time so that more than one period can be defined per day or so that periods can start at a specific time within a day). For example a manufacturing plant may have a workday calendar that contains only those days on which the plant is open (excluding weekends, holidays, shutdowns, etc.).

A date can be coerced to the nearest day in a calendar, and can also be used in date arithmetic operations. For example: if the date a job will start is known, and that it will take three periods, then the calendar support can calculate the actual date (and time) the job will be finished. The set of dates (and times) that makes up a calendar is part of the versioned data model.

Unit of Measure

Many fields in a database refer to some physical entity, such as the minimum amount of a product that can be purchased. Understanding the meaning of the field requires understanding the units the field is defined in.

In a traditional database, one would define the units for a field as a second column (and the database itself would not be aware of the relationship between the two columns) or just leave it out of the database altogether and make it part of the implied knowledge required by applications and users to use the database.

The server described here provides support for unit of measure as a special numeric data type. For example, cabling may be sold for a given price per foot, whereas sand is sold by the cubic yard. In the server data model this information can be captured in a single field.

A UnitOfMeasure table defines the units the server can work with. This table would typically include standard scientific measures (meters, kilograms, etc.) but can also contain custom units. For example, if a product were sold by the dozen, its UnitOfMeasure would be Dozen.

A UnitOfMeasure conversion table defines the factors necessary to convert between units. For example, to convert from meters to feet, multiply by 0.3048. This allows data entry and reporting to be performed using any compatible units. A unit of measure can have dimensions assigned to it, such as length, mass, or time. A given field can then have integrity constraints based on these dimensions. For example, a certain value must be a length, but the server will allow input in either feet or meters.

Currency

Many database systems provide a monetary data type. However, a single number is not sufficient to define a monetary value—one needs to know the currency it is in. In an application dealing with global data, there may be multiple different currencies involved. In a traditional database an additional column would be added to specify the currency, and the database itself would not be aware of the relationship between the two columns.

In this embodiment, the server provides a monetary data type that implicitly has a currency associated with it. Currency is similar to the unit of measure concept, but with the important distinction that the conversion factors can vary over time. A Currency table is used to define the set of currencies the server supports. This table holds the information about the currency: its name, symbol, etc. An ExchangeRate table is used to define currency exchange rates. Each row in the table defines a source currency, a target currency, the rate and the time the exchange rate is effective from. Conversion rates becoming effective at a later date supersede the previous rate.

The server provides built in support for converting from one currency to another using the ExchangeRate table. For example, if there is a price field that holds prices in the local currency but one wants to report all prices in US dollars then one can specify this as a formatting option for the query (producing a calculated column in the report).

Query Manager & Connection Services

Figure 9:
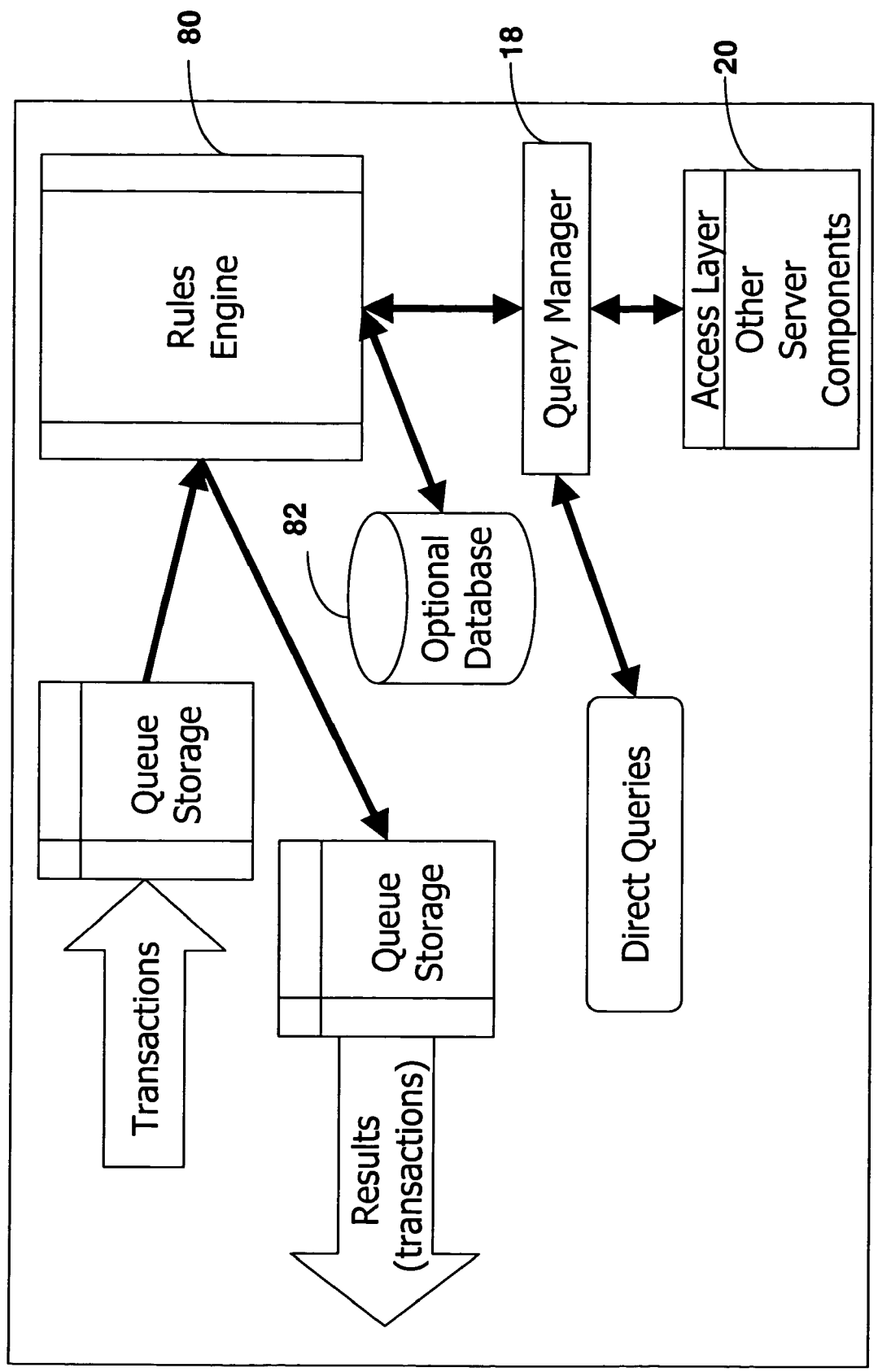
FIG. 9 is a block diagram showing connection services.

Referring to FIG. 9, the elements of the connection services are shown. The general concepts of these connection services are present in a previously provided Webplan Inc. product, but there are differences in the system described here because of the interaction with a different access layer. Interfaces can be provided to/from other systems through wide area networks, such as the Internet. For example, the analytics can be designed to generate results indicating when certain parts should be ordered to obtain delivery within a desired period of time in order to be able to produce a quantity of systems assembled from those parts. The output can thus be provided to a user, such as on a display, but can be provided additionally or alternatively to other systems or processes, such as to suppliers as purchase orders.

In addition, incoming data can be used to change input data potentially to re-calculate a scenario. For example, a supplier might provide notice that the lead time on a part has become shorter or longer; in this case, the new information from the supplier can be provided directly into the system and used to re-calculate certain assumptions that may have been made in a previous scenario.

Access layer 20 responds to queries (the term "query" includes read, create, modify, and delete) from query manager 18 against the versioned database. The structure of queries in general is well understood in the field. Query manager 18 can accept queries from a rules engine 80 and can accept direct queries from other interfaces, such as interfaces to systems run by other parties.

Query manager 18 includes special handling to generate duplicate queries, one against each selected version, to make it easier to compare data among different versions. The results from duplicated queries are then merged to return single records containing the individual results from each version. The queried versioned data can include input data, results of calculations, and expressions containing input and calculated data. Thus, if there are multiple version nodes, a report can be generated with multiple versions at the same time.

In the preferred implementation, the Query Manager is itself a managed assembly, like analytics, so the server can use more than one query engine at time, thereby supporting more than one query syntax.

Connection Services can accept a stream of transactions (requests). Using a set of rules, data from the transaction (or from a set of related transactions), and data from one or more additional optional databases 82, connection services can transform transactions into one or more query actions to the server. Simple or complex transactions can be implemented, depending upon the complexity of the rules. Connection Services also provides data from the server as results to other systems, including reformatting the data as may be required.

While certain embodiments have been described, others are encompassed by the claims. For example, the engine can be linked to different databases and can be linked to more than one such database simultaneously. While in-memory caching of database contents significantly improves performance, value can be gained by using the concepts of versioned data and "results as data" without data caching. To provide increased throughput and/or capacity at an economical cost, the elements of the invention, and even elements of the server itself, can be run on physically separate computers. Further, server functionality can be partitioned into natural clusters such as by version or physical location represented by the data.

One implementation of embodiments of the present invention is for decision support for manufacturing, distribution and supply chain applications, but the engine could be used for a wide variety of other business and other applications including financial, such as collaborative budgeting, operations management, and projected pro-form a financial statements from current and forecast data. The engine can also be used as a direct execution tool, especially when directly coupled to other execution systems. In this implementation, the engine would be used to automate decisions and directly communicate those decisions to other systems as well as for interactive (with people) decision support. The engine is also applicable to other database applications where versioning and calculation performance are useful.

While memory 12 is shown in the server box in FIG. 1, the server memory can be any memory controlled by the server and separate from the database tables.

Some of the functions described above can be implemented in a database system that has a cache memory. In this case, the version manager functionality is implemented within the database system. The cache is separate from the main database table and is used for maintaining version nodes with data in field groups as shown in FIGS. 2-6. An external server could then access data from this cache memory in addition to or instead of from cache memory in the server.

What is claimed is:

1. A method implemented in a system that includes a database for storing input data and a server, the method comprising:

the server managing multiple versions of the input data, wherein each version of the input data is stored as a record in the database with each record having an identifier and a version field;
the server receiving a query for data;
in response to the query, identifying whether the requested data is available in a cache;
if the requested data is not available in the cache, identifying an analytic to calculate data from input data;
retrieving from a database input data associated with the analytic and storing the input data in the cache, if not already present in the cache, wherein the input data are stored in the cache in one or more pages of records with a list of identifiers and a set of versions for each identifier, wherein at least one record has multiple versions;
using the analytic to perform calculations with the analytic on the records of input data determined to have the correct version related to the query to produce calculated data, wherein multiple versions of a record are based on multiple plans, and wherein the query is associated with a plan and the correct version of a record is determined based on the plan with which the query is associated;
storing the calculated data into the cache; and
downloading a schema which is used to generate a data access layer, the data access layer exposing tables in the database as classes with properties corresponding to fields in the tables, and in response to changes made to the schema, automatically regenerating the access layer.

2. The method of claim 1, wherein the cache includes an input data cache and a calculated data cache.

3. The method of claim 1, further comprising, after calculations are performed on the input data to produce calculated data, modifying the input data in the cache and re-calculating the analytic to produce new calculated data without retrieving the input data from the database.

4. The method of claim 3, wherein the re-calculating is performed automatically without a user request.

5. The method of claim 3, wherein the modifying includes receiving modifications from another system over a wide area network and through an interface.

6. The method of claim 1, wherein the server creates an inverse set for at least one field, the inverse set including the field and a list of identifiers of records that have the same value for that field.

7. The method of claim 1, wherein the records are stored in the database with fields, wherein groups of fields are organized into a plurality of separate field groups.

8. The method of claim 7, wherein the data is arranged in version nodes with field groups.

9. The method of claim 1, wherein the analytic includes a supply chain management analytic.

10. The method of claim 9, wherein the analytic relates to material requirements planning or capable-to-promise calculations.

11. The method of claim 1, further comprising accepting data changes and providing calculated results over a wide area network to another system.

12. The method of claim 1, wherein a plurality of different versions of data, whether input or calculated, can be compared to show the differences between versions.

13. The method of claim 1, further comprising defining namespaces, including at least a server namespace and a separate user namespace for a user of the system.

14. The method of claim 13, further comprising, in response to receiving a name of a field or table for use in the server namespace, renaming that name to the user namespace.

15. The method of claim 1, wherein the retrieving includes retrieving some but not all data fields in the database for a group of records.

16. The method of claim 1, wherein the multiple versions of a record with multiple versions are stored as a list linked to the identifier for said record.

17. The method of claim 1, wherein the analytic includes an algorithm to calculate data for projecting future conditions from data in one or more tables in the database.

18. The method of claim 1, wherein a new version of the multiple versions of input data is stored by storing the changes between the new version and an older version of the multiple versions.

19. The method of claim 18, wherein the records of an input data determined to have the correct version is generated from the stored changes.

20. A system for calculating analytics comprising:
a database for storing data, at least some of which data is for use by analytics to produce calculated results in response to queries;
a server having a cache and responsive to a query for input data or calculated data for
managing multiple versions of the input data, wherein each version of the input data is stored as a record in the database with each record having an identifier and a version number indicating with which of one or more versions the data the record is associated, wherein the input data are stored in the cache in one or more pages of records with a list of identifiers and a set of versions for each identifier, wherein at least one record has multiple versions wherein multiple versions of a record are based on multiple plans, and wherein the query is associated with a plan and a correct version of a record is determined based on the plan with which the query is associated,
identifying whether the requested data is available in a cache,
if the requested data is not available in the cache, identifying an analytic to produce a response,
retrieving input data associated with the analytic from the database and storing the input data in the cache if not already present in the cache,
performing calculations with the analytic on the records of input data determined to have the correct version related to the query to produce calculated data,
storing the calculated data into the cache without storing the calculated data in the database; and
downloading a schema which is used to generate a data access layer, the data access layer exposing tables in the database as classes with properties corresponding to fields in the tables, and in response to changes made to the schema, automatically regenerating the access layer.

21. The system of claim 20, wherein after calculations are performed on the input data to produce calculated data, the server is responsive to modifications to the input data in the input data cache for re-calculating the analytic to produce new calculated data without retrieving the input data in the database.

22. The system of claim 21, wherein the re-calculating is performed automatically without a user request.

23. The system of claim 21, wherein the modifying includes receiving modifications from another system over a wide area network and through an interface.

24. The system of claim 20, wherein the records are stored in the database with groups of fields organized into a plurality of field groups.

25. The system of claim 20, wherein the analytic includes a supply chain management analytic.

26. The system of claim 25, wherein the analytic relates to material requirements planning or capable-to-promise calculations.

27. The system of claim 20, wherein the server has an interface to accept data changes and provide calculated results over a wide area network to another system.

28. The system of claim 20, wherein the server is responsive to queries for different versions of data to show the differences of calculated results between versions.

29. The system of claim 20, the multiple versions of a record with multiple versions are stored as a list linked to the identifier for said record.

30. The system of claim 20, wherein the analytic includes an algorithm to calculate data for projecting future conditions from data in one or more tables in the database.

31. The system of claim 20, wherein a new version of the multiple versions of input data is stored by storing the changes between the new version and an older version of the multiple versions.

32. The system of claim 31, wherein the records of an input data determined to have the correct version is generated from the stored changes.

* * * * *